US009896001B1

(12) United States Patent
Brodish

(10) Patent No.: US 9,896,001 B1
(45) Date of Patent: Feb. 20, 2018

(54) SWIVEL BASE ASSEMBLY WITH FORE/AFT/ROTATIONAL MOVEMENT AND WARPING FEATURES

(71) Applicant: Goodrich Corporation, Charlotte, NC (US)

(72) Inventor: Troy Brodish, Black Forest, CO (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 15/237,206

(22) Filed: Aug. 15, 2016

(51) Int. Cl.
| | | |
|---|---|---|
| *B60N 2/14* | (2006.01) | |
| *B60N 2/02* | (2006.01) | |
| *B64D 11/06* | (2006.01) | |
| *A47C 3/18* | (2006.01) | |
| *B60N 2/06* | (2006.01) | |

(52) U.S. Cl.
CPC .............. *B60N 2/02* (2013.01); *A47C 3/18* (2013.01); *B60N 2/062* (2013.01); *B64D 11/0639* (2014.12); *B64D 11/0696* (2013.01)

(58) Field of Classification Search
CPC ............ B64D 11/0696; B64D 11/0639; B64D 11/0643; B64D 11/0648; B60N 2/02; B60N 2/062; B60N 2/508; B60N 2/143; B60N 2/146; A47C 3/18
See application file for complete search history.

(56) References Cited

U.S. PATENT DOCUMENTS

| | | | |
|---|---|---|---|
| 5,125,598 A | 6/1992 | Fox | |
| 5,853,221 A * | 12/1998 | Thoman ................. | B60N 2/143 248/418 |
| 6,149,118 A | 11/2000 | Ruff | |
| 6,691,970 B1 * | 2/2004 | Sutton, Sr. ............. | B60N 2/062 248/425 |
| 2012/0019032 A1 | 1/2012 | Sjoquist et al. | |
| 2014/0217796 A1 * | 8/2014 | Haller .................... | B60N 2/508 297/344.26 |

* cited by examiner

*Primary Examiner* — Anita M King
(74) *Attorney, Agent, or Firm* — Snell & Wilmer, L.L.P.

(57) ABSTRACT

Systems and methods for swivel base assemblies for seats are provided. A swivel base assembly for an aircraft seat may comprise a swivel center beam, a swivel plate pivotally coupled to the swivel center beam, the swivel plate configured to rotate with respect to the swivel center beam about a first centerline axis, a first side rail coupled to the swivel center beam, and a second side rail coupled to the swivel center beam, the swivel center beam being located between the first side rail and the second side rail.

17 Claims, 8 Drawing Sheets

SWIVEL BASE ASSEMBLY WITH FORE/AFT/ROTATIONAL MOVEMENT AND WARPING FEATURES

FIELD

The present disclosure relates to retaining systems and, in particular, to retaining systems for retaining aircraft seats.

BACKGROUND

Air vehicles generally include seats for pilot(s) and/or passenger(s). These seats may have base assemblies for attaching the seats to the air vehicle. The base assembly may be fixed to an airframe and the seat may be coupled to the base assembly.

SUMMARY

Systems and methods for swivel base assemblies for seats are provided herein. A swivel base assembly for an aircraft seat may comprise a swivel center beam, a swivel plate pivotally coupled to the swivel center beam, the swivel plate configured to rotate with respect to the swivel center beam about a first centerline axis, a first side rail coupled to the swivel center beam, and a second side rail coupled to the swivel center beam, the swivel center beam being located between the first side rail and the second side rail.

In various embodiments, a track lug may be pivotally coupled to the first side rail, the track lug configured to retain the first side rail in a track and translate along the track. A track pin may be coupled to the first side rail, the track pin configured to prevent the first side rail from translating along the track in response to the track pin being in an extended position. A swivel stud foot may be coupled to the swivel center beam and the first side rail comprises a slot, the swivel stud foot configured to pass through the slot in response to the swivel plate rotating about the first centerline axis. The swivel center beam may define a center aperture comprising the first centerline axis, a pivot coupled between the center aperture and the swivel plate. The swivel center beam may comprise a center body, a first member extending from the center body having a first aperture for receiving a first sliding bar for coupling the first member to the first side rail, a second member extending from the center body having a second aperture for receiving a second sliding bar for coupling the second member to the first side rail, a third member extending from the center body having a third aperture for receiving a first fastener for attaching the third member to the second side rail, and a fourth member extending from the center body having a fourth aperture for receiving a second fastener for attaching the fourth member to the second side rail. The first aperture may comprise a second centerline axis, the second centerline axis being perpendicular with the first centerline axis. The first member may be configured to receive a pin for retaining the first sliding bar at least partially within the first aperture. The pin may extend in a direction being perpendicular with the second centerline axis. The pin may be configured to shear in response to the swivel center beam moving relative to the first side rail in a direction along the second centerline axis. The center body, the first member, the second member, the third member, and the fourth member may comprise a single, monolithic member.

A swivel center beam for an aircraft seat base assembly may comprise a center body having a first centerline axis, a first member extending from the center body having a first aperture for receiving a first sliding bar for coupling the first member to a first side rail, a second member extending from the center body having a second aperture for receiving a second sliding bar for coupling the second member to the first side rail, a third member extending from the center body having a third aperture for receiving a first fastener for attaching the third member to a second side rail, and a fourth member extending from the center body having a fourth aperture for receiving a second fastener for attaching the fourth member to the second side rail.

In various embodiments, the first aperture may comprise a second centerline axis, the second centerline axis being perpendicular with the first centerline axis. The first member may be configured to receive a pin for retaining the first sliding bar at least partially within the first aperture. The pin may extend in a direction being perpendicular with the second centerline axis. The pin may be configured to shear in response to the swivel center beam moving relative to the first side rail in a direction along the second centerline axis. The center body, the first member, the second member, the third member, and the fourth member may comprise a single, monolithic member.

A method of manufacturing a swivel base assembly for an aircraft seat may comprise coupling a first end of a first sliding bar to a side rail, positioning a second end of the first sliding bar into a first aperture disposed in a swivel center beam, and positioning a pin, the pin extending at least partially into a second aperture disposed in the swivel center beam and into an aperture disposed in the first sliding bar.

In various embodiments, the coupling the first end may be performed by bolting the first end to the side rail. The pin may be configured to shear in response to the side rail moving with respect to the swivel center beam.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface cross hatching lines may be used throughout the figures to denote different parts but not necessarily to denote the same or different materials.

Air vehicles generally include seats for pilot(s) and/or passenger(s). Some seats, including seats for military and medical air vehicles, may benefit from being movable in various directions. These seats may have base assemblies for attaching the seats to the air vehicle. In this regard, these seats may benefit from base assemblies which allow the seat to move in such various directions.

Swivel base assemblies of the present disclosure include a swivel center beam pivotally coupled to a swivel plate. The pivoting relationship between the swivel center beam and the swivel plate may allow a seat to pivot about a centerline axis. The swivel center beam is also coupled to a first side rail and a second side rail. The swivel center beam may be coupled to the first side rail via sliding bars to allow relative movement between the swivel center beam and the first side rail and thus accommodate warping of the swivel base assembly. Further, the side rails may be coupled to their respective tracks to allow a seat to translate within the tracks (i.e., slide forward and backwards, or side to side, etc.)

Figure 1:
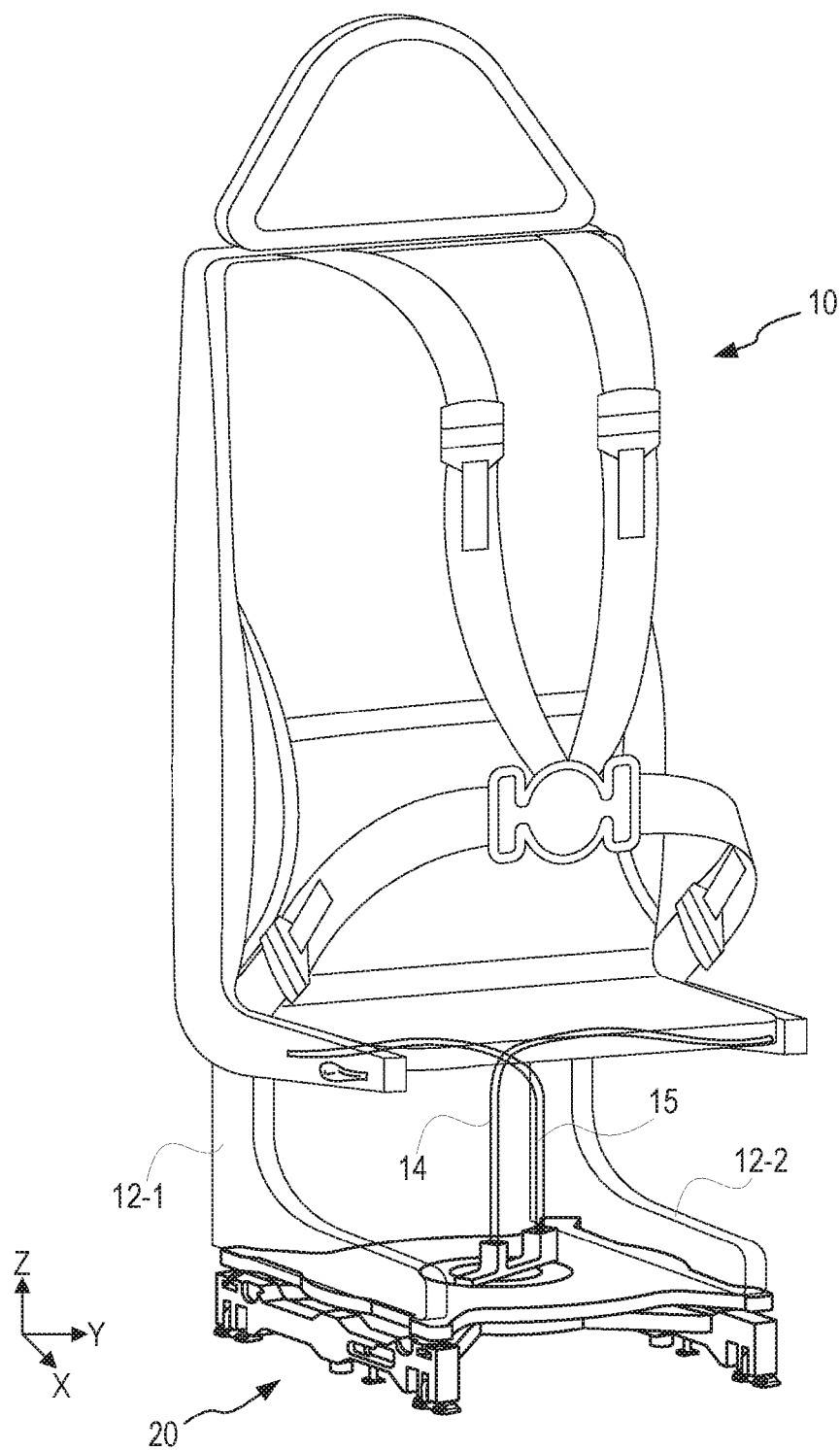
FIG. 1 illustrates an aircraft seat coupled to a swivel base assembly, in accordance with various embodiments.

With reference to FIG. 1, a seat 10 is illustrated. A first base member 12-1 of the seat 10 may be coupled to a swivel base assembly 20. A second base member 12-2 of the seat 10 may be coupled to a swivel base assembly 20. A first cable 14 may extend between swivel base assembly 20 and seat 10 for control of swivel base assembly 20. A second cable 15 may extend between swivel base assembly 20 and seat 10 for control of swivel base assembly 20. In various embodiments, seat 10 may comprise an air vehicle seat. Swivel base assembly 20 may be coupled to the floor or body of the air vehicle. Swivel base assembly 20 may secure seat 10 to the floor or body (i.e., airframe 92 of FIG. 4A). Swivel base assembly 20 may allow seat 10 to move in various directions relative to swivel base assembly 20 as described herein.

Figure 2:
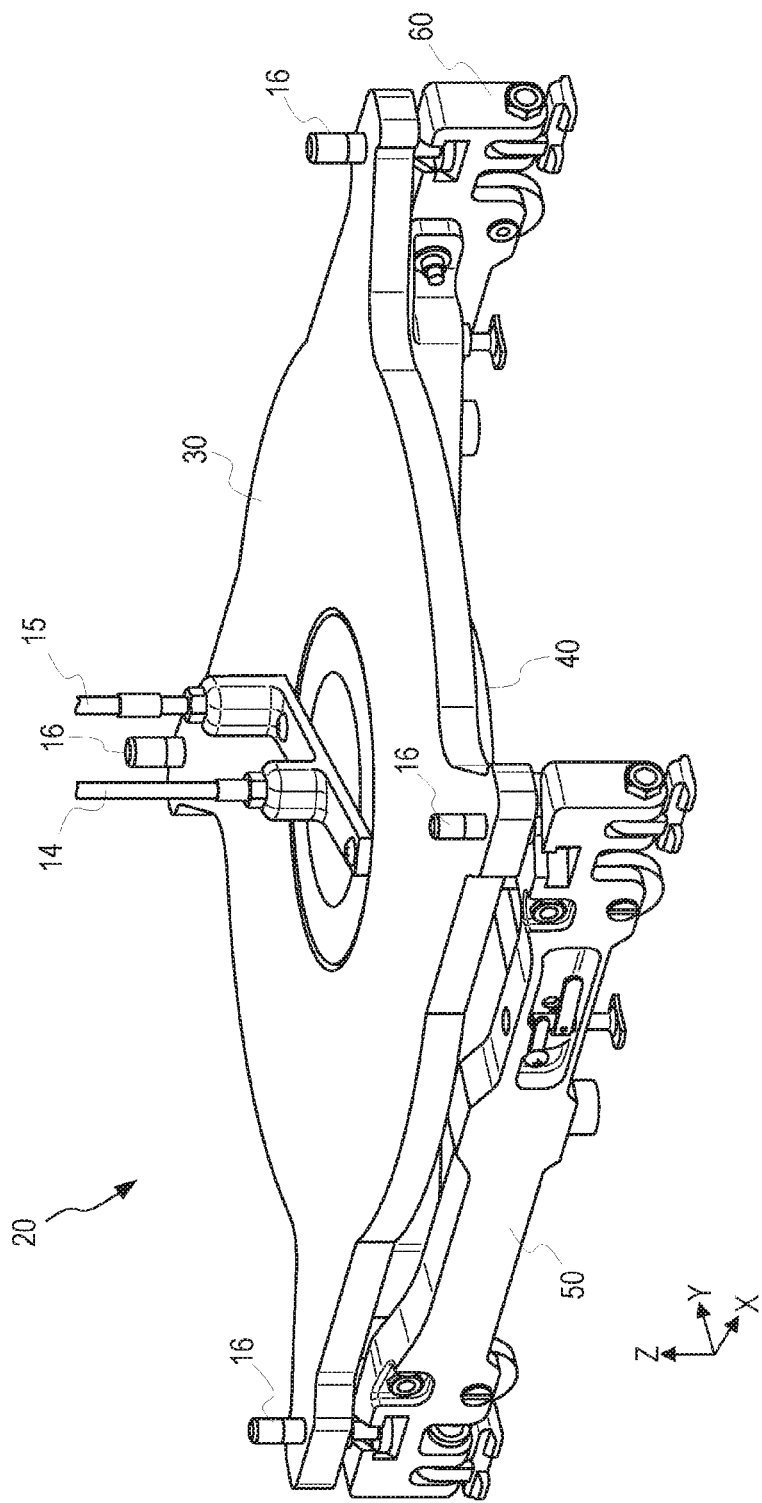
FIG. 2 illustrates a swivel base assembly, in accordance with various embodiments.

With reference to FIG. 2, swivel base assembly 20 may include swivel plate 30, in accordance with various embodiments. Swivel plate 30 may comprise a plurality of attachment features 16 for attaching base members 12-1 and 12-2 (see FIG. 1) to swivel plate 30. In various embodiments, attachment features 16 may comprise a boss extending from swivel plate 30. In various embodiments, attachment features 16 may comprise a lug, a bolt, a rod, or the like. In various embodiments, swivel plate 30 may comprise four attachment features 16, as illustrates in FIG. 2. However, swivel plate 30 may comprise any number of attachment features 16.

In various embodiments, swivel base assembly 20 may include swivel center beam (also referred to herein as center beam) 40. Center beam 40 may be pivotally coupled to swivel plate 30.

In various embodiments, swivel base assembly 20 may include a first side rail 50. In various embodiments, swivel base assembly 20 may include a second side rail 60. In various embodiments, second side rail 60 may be similar to first side rail 50. First side rail 50 may be coupled to center beam 40. Second side rail 60 may be coupled to center beam 40. Center beam 40 may be located between first side rail 50 and second side rail 60.

Figure 3:
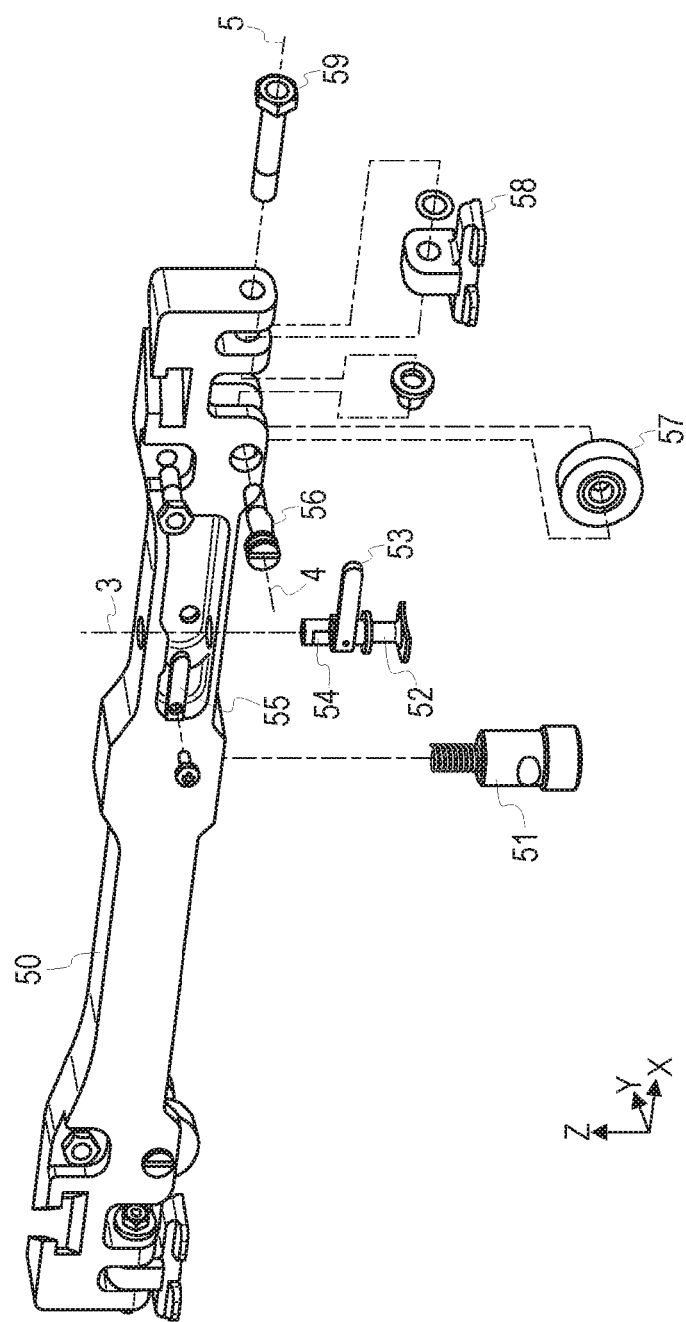
FIG. 3 illustrates a partially exploded view of a side rail, in accordance with various embodiments.

With reference to FIG. 3, a view of first side rail 50 is illustrated, in accordance with various embodiments. First side rail 50 may include a track pin 51. With momentary reference to FIG. 4A, swivel base assembly 20 may include a first track 70. First track 70 may be secured to a floor. First track 70 may be secured to a floor of an aircraft. In various embodiments, first track 70 may comprise a scalloped track. First track 70 may have a series of rounded portions 71 at least partially defining a series of tabs 72 which extend inwards. Track pin 51 may comprise a diameter equal to the diameter of the rounded portions 71. Track pin 51 may comprise a diameter which is slightly less than the diameter of the rounded portions 71. For example, the diameter of track pins 51 may be between 90% and 99.99% of the diameter of rounded portions 71.

In various embodiments, with combined reference to FIG. 2 and FIG. 3, track pin 51 may be operatively coupled to first cable 14. Track pin 51 may be actuated (i.e., translated in the z-direction) via first cable 14. With momentary reference to FIG. 5, rod 61 may comprise a first bell crank 62. First bell crank 62 may be located between a first end and a second end of the rod 61. Rod 61 may comprise a second bell crank 63. Second bell crank 63 may be located at a first end of rod 61. The first end of rod 61 may be rotatably coupled to first side rail 50. For example, the first end of rod 61 may be inserted into an orifice of first side rail 50. Rod 61 may comprise a third bell crank 64. Third bell crank 64 may be located at a second end of rod 61. The second end of rod 61 may be rotatably coupled to second side rail 60. For example, the second end of rod 61 may be inserted into an orifice (not visible in FIG. 5) of second side rail 60. First cable 14 may be coupled to rod 61 via first bell crank 62. Track pin 51 may be coupled to rod 61 via second bell crank 63. In this regard, in response to first cable 14 being actuated, rod 61 may rotate about a centerline axis 2 and translate track pin 51 (in the z-direction). With combined reference to FIG. 4A and FIG. 5, track pin 51 may be retracted into first side rail 50 and/or pulled from rounded portion 71 of first track 70 in response actuating first cable 14.

With reference to FIG. 3, first side rail 50 may include a keeper pin 52. Keeper pin 52 may be rotated about centerline axis 3 via handle 53. A bias 55 may be in contact with slotted portion 54 of keeper pin 52 to prevent keeper pin 52 from rotating. However, in response to a force being greater than the force of bias 55 being applied to keeper pin 52 via handle 53, keeper pin 52 may rotate.

In various embodiments, first side rail 50 may include a roller 57 coupled to an eccentric axle 56. Eccentric axle 56 may be coupled to first side rail 50. In various embodiments, eccentric axle 56 may be rotated about axis 4 to raise (in the positive z-direction) or lower (in the negative z-direction) roller 57. In this regard, the height of roller 57 may be adjustable via eccentric axle 56. First side rail 50 may comprise a plurality of rollers 57. For example, as illustrated in FIG. 3, first side rail 50 may comprise two rollers 57.

With continued reference to FIG. 3, first side rail 50 may comprise a track lug 58. Track lug 58 may be rotatably coupled to fastener 59. In various embodiments, fastener 59 may comprise a bolt, pin or the like. Track lug 58 may be rotatable about centerline axis 5. With momentary additional reference to FIGS. 4A-4C, a rotatable track lug 58 may accommodate warping of swivel base assembly 20. A rotatable track lug 58 may prevent members of swivel base assembly 20 from failing during events such as warping. In this regard, a rotatable track lug 58 may allow first side rail 50 to rotate with respect to first track 70.

Figure 4A:
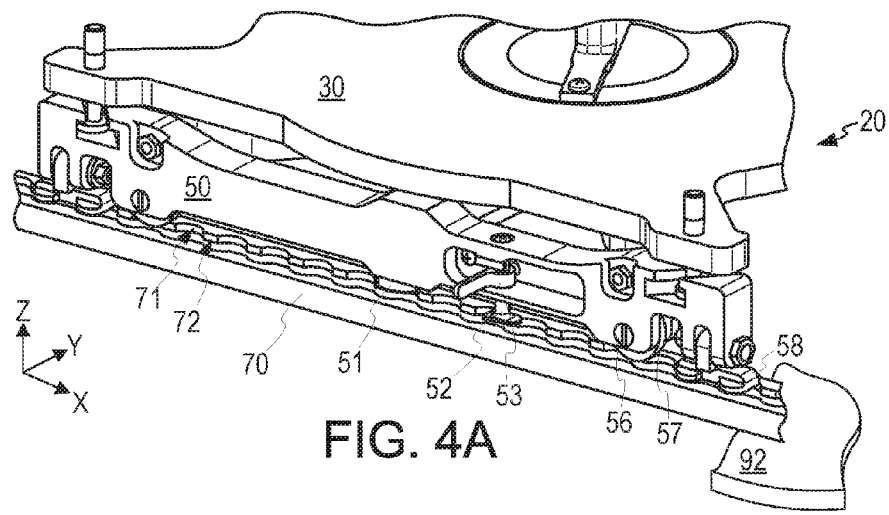
FIGS. 4A-4C illustrate an installation process of a first side rail into a first track, in accordance with various embodiments.
Figure 4B:
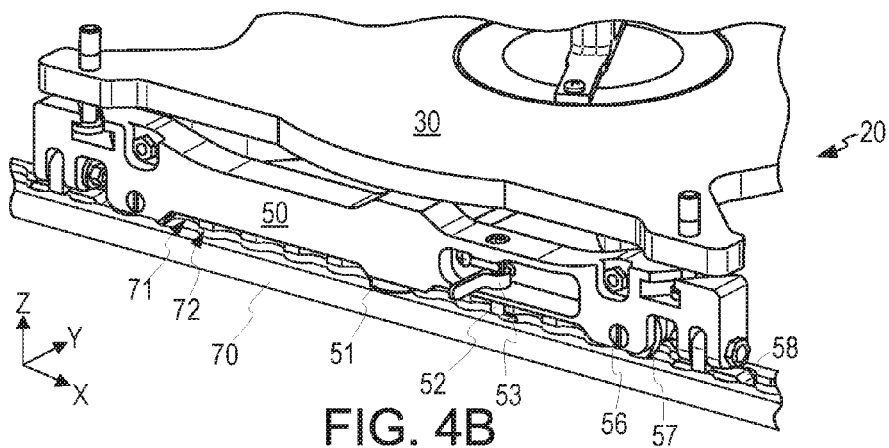
Figure 4C:
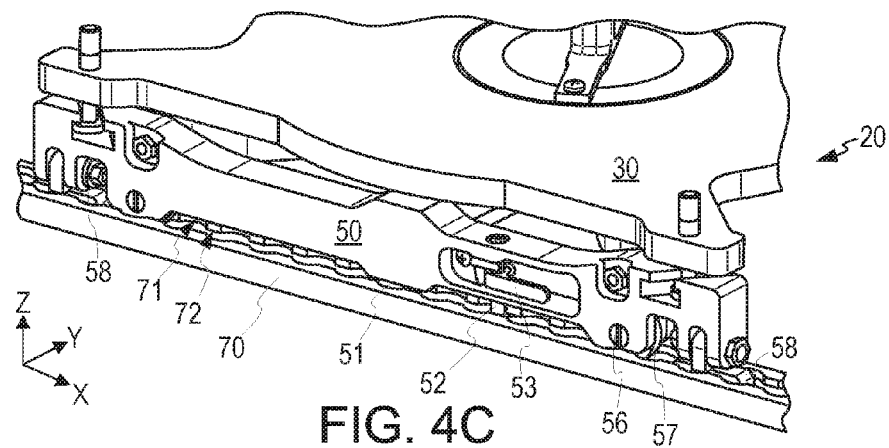

With combined reference to FIGS. 4A-4C, the installation process of first side rail 50 onto first track 70 is illustrated, in accordance with various embodiments. FIG. 4A illustrates the beginning of the installation process with handle 53 in the open position and first side rail 50 being located above first track 70. First track 70 may be coupled to airframe 92. Airframe 92 is only partially illustrated in FIG. 4A for clarity purposes. FIG. 4B illustrates first side rail 50 lowered into first track 70. Track pin 51 may be located directly above a rounded portion 71. Eccentric axle 56 may be adjusted so that track lugs 58 are able to translate (in the x-direction) within first track 70. FIG. 4C illustrates handle 53 in the closed position. With handle 53 in the closed position, keeper pin 52 is rotated such that keeper pin 52 prevents first side rail 50 from moving (in the positive z-direction) relative to first track 70. Further, track pin 51 may be extended (in the negative z-direction) and located within a rounded portion 71 of first track 70. In this manner, track pin 51 may prevent first side rail 50 from translating (in the x-direction) with respect to first track 70. Further, track pin 51 may prevent first side rail 50 from moving in the x-y plane with respect to first track 70.

In various embodiments, first side rail 50 may translate or move along first track 70 (in the x-direction) in response to first cable 14 (see FIG. 2) being actuated to lift track pin 51 from a rounded portion 71 of first track 70. A force may be applied to first side rail 50 (in the x-direction) to move first side rail 50 along first track 70 (in the x-direction). During this movement, track lugs 58 may prevent first side rail 50 from moving in the positive z-direction with respect to first track 70, while allowing first side rail 50 to translate with respect to first track 70 in the x-direction. Stated another way, track lugs 58 may retain first side rail 50 within first track 70 and translate in first track 70.

Figure 5:
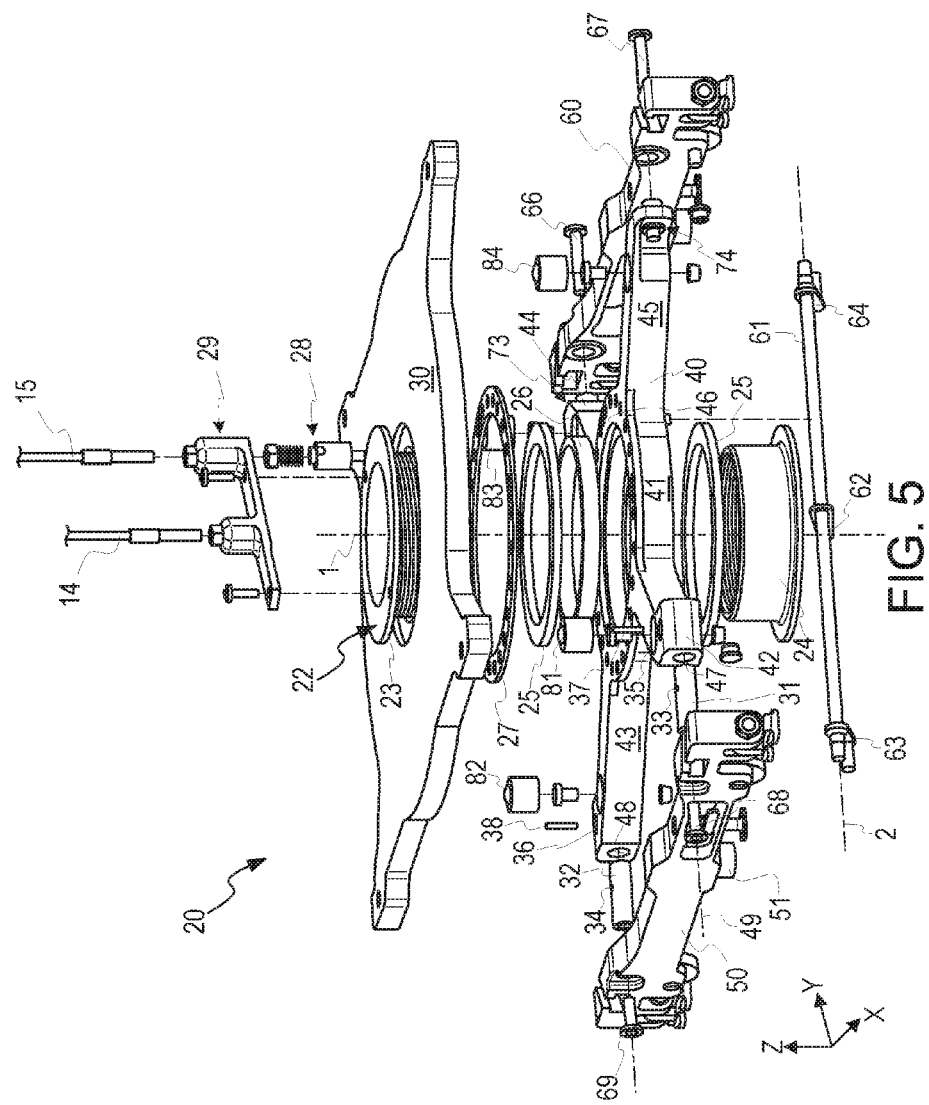
FIG. 5 illustrates an exploded view of a swivel base assembly, in accordance with various embodiments.

With reference to FIG. 5, center beam 40 may comprise a center body 41, a first member 42, a second member 43, a third member 44, and a fourth member 45. In various embodiments, center body 41, first member 42, second member 43, third member 44, and fourth member 45 may comprise a single, monolithic member. Center body 41 may define a center aperture 46. Center aperture 46 may comprise a centerline axis (also referred to herein as a first centerline axis) 1. First member 42 may extend from center body 41. First member 42 may extend in a direction away from centerline axis 1. Second member 43 may extend from center body 41. Second member 43 may extend in a direction away from centerline axis 1. Third member 44 may extend from center body 41. Third member 44 may extend in a direction away from centerline axis 1. Fourth member 45 may extend from center body 41. Fourth member 45 may extend in a direction away from centerline axis 1. Third member 44 may be coupled to second side rail 60. Fourth member 45 may be coupled to second side rail 60.

In various embodiments, center beam 40 may be coupled to second side rail 60 via fastener (also referred to herein as first fastener) 66. Center beam 40 may be coupled to second side rail 60 via fastener (also referred to herein as second fastener) 67. In various embodiments, fasteners 66, 67 may comprise bolts. In this regard, center beam 40 may be fixed to second side rail 60. Third member 44 may comprise an aperture (also referred to herein as a third aperture) 73 for receiving fastener 66 for coupling third member 44 to second side rail 60. In various embodiments, fourth member 45 may comprise an aperture (also referred to herein as a fourth aperture) 74 for receiving fastener 67 for coupling fourth member 45 to second side rail 60.

In various embodiments, swivel base assembly 20 may include first sliding bar 31 and second sliding bar 32. First sliding bar 31 and second sliding bar 32 may each comprise a metallic cylindrical bar. First sliding bar 31 may comprise a centerline axis 49. In various embodiments, centerline axis 49 may be substantially perpendicular to centerline axis 1, wherein the term substantially in this regard may refer to within ±5 degrees. First sliding bar 31 may comprise an aperture 33 for receiving first pin 37 for retaining first sliding bar 31 at least partially within aperture (also referred to herein as first aperture) 47. First pin 37 may extend through aperture 35 of first member 42 and aperture 33 of first sliding bar 31 to retain first sliding bar 31 at least partially within aperture 47. In this regard, aperture 47 may receive a portion of first sliding bar 31. In various embodiments, first pin 37 may be configured to shear in response to center beam 40 moving relative to first side rail 50 along centerline axis 49 (i.e., in the positive y-direction). In this regard, center beam 40 may translate along centerline axis 49 (in the y-direction) relative to first sliding bar 31. Fastener 68 may threadingly attach to first sliding bar 31 to attach first sliding bar 31 to first side rail 50. In this regard, first sliding bar 31 may be fixed to first side rail 50. Similarly, second sliding bar 32 may be fixed to first side rail 50 via fastener 69. Second pin 38 may extend through aperture 34 and aperture 36 to retain a portion of second sliding bar 32 within aperture (also referred to herein as second aperture) 48 of second member 43. In this regard, aperture 48 may receive a portion of second sliding bar 32.

With continued reference to FIG. 5, swivel base assembly 20 may include a pivot 22. In various embodiments, pivot 22 may comprise a first sleeve 23 and a second sleeve 24. First sleeve 23 may be threadingly attached to second sleeve 24. Second sleeve 24 may circumferentially surround first sleeve 23. One or more bearings 25 may circumferentially surround second sleeve 24. A ring 26 may circumferentially surround second sleeve 24. Ring 26 may comprise a delrin ring. Although illustrated as comprising first sleeve 23, second sleeve 24, bearings 25, and ring 26, pivot 22 may comprise any suitable member or members for pivotally attaching swivel plate 30 to center beam 40.

In various embodiments, a metering plate 27 may be coupled to center beam 40. In various embodiments, metering plate 27 may comprise an annular geometry having a plurality of apertures disposed in metering plate 27. A swivel pin 28 may extend through swivel plate 30 and into metering plate 27 (i.e., into an aperture disposed in metering plate 27) to prevent swivel plate 30 from rotating about centerline axis 1, relative to center beam 40. Swivel pin 28 may be operatively coupled to second cable 15. Swivel plate 30 may be free to rotate about centerline axis 1, relative to center beam 40, in response to second cable 15 retracting swivel pin 28 from metering plate 27. Second cable 15 may be coupled to a lever on seat 10 (see FIG. 1). Pivot 22 may rotate about centerline axis 1 with swivel plate 30. Stated another way, pivot 22 may be fixed to swivel plate 30. A bracket 29 may couple first cable 14 and second cable 15 to swivel plate 30.

With continued reference to FIG. 5, swivel base assembly 20 may include a plurality of roller bearings (i.e., first roller bearing 81, second roller bearing 82, third roller bearing 83, and fourth roller bearing 84) for supporting swivel plate 30. In various embodiments, first roller bearing 81 may be coupled to first member 42 of center beam 40. In various embodiments, second roller bearing 82 may be coupled to second member 43 of center beam 40. In various embodiments, third roller bearing 85 may be coupled to third member 44 of center beam 40. In various embodiments, fourth roller bearing 84 may be coupled to fourth member 45 of center beam 40.

Figure 6:
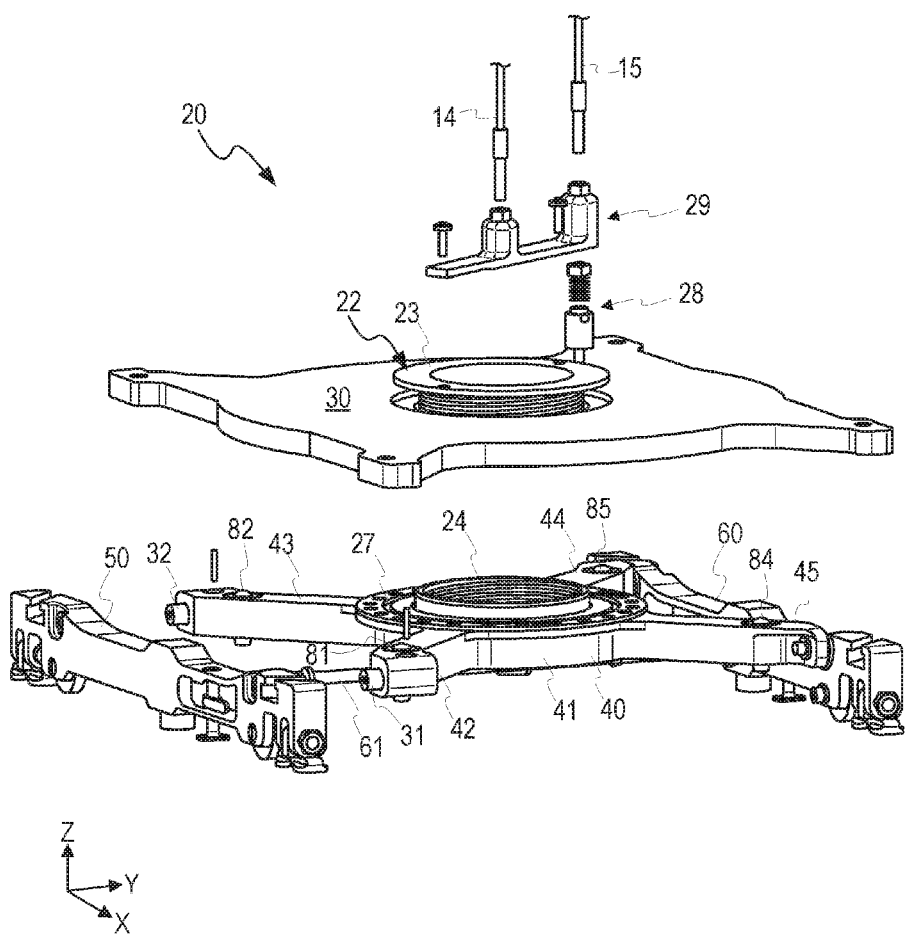
FIG. 6 illustrates a partially exploded view of a swivel base assembly, in accordance with various embodiments.

With respect to FIG. 6, elements with like element numbering, as depicted in FIGS. 1-5, are intended to be the same and will not necessarily be repeated for the sake of clarity. FIG. 6 illustrates first sliding bar 31 and second sliding bar 32 inserted into first member 42 and second member 43, respectively.

Figure 7:
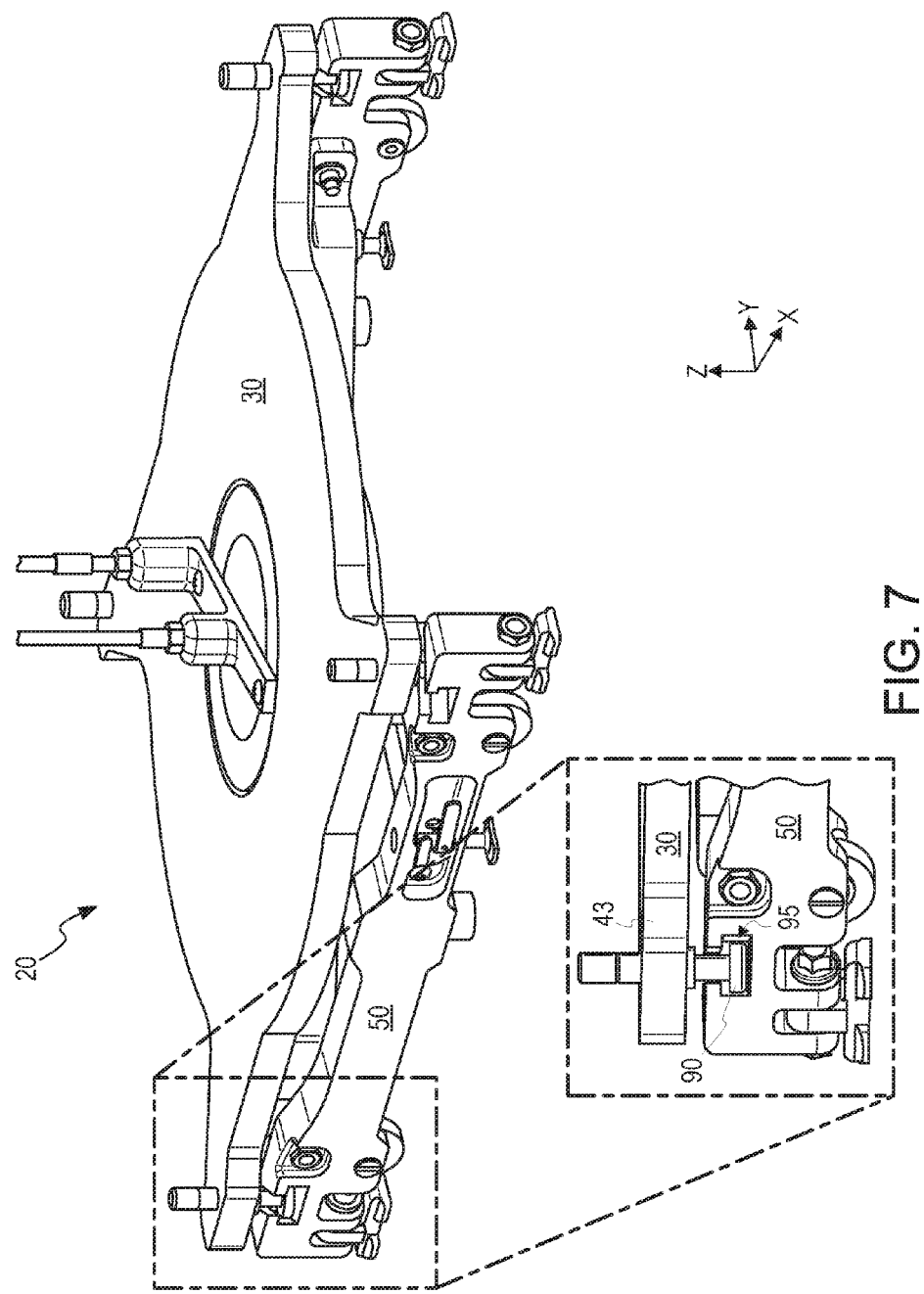
FIG. 7 illustrates a close-up view of a swivel stud located in a slot of a side rail, in accordance with various embodiments.

With respect to FIG. 7, elements with like element numbering, as depicted in FIGS. 1-6, are intended to be the same and will not necessarily be repeated for the sake of clarity. In various embodiments, first side rail 50 may comprise a slot 95 for receiving a swivel stud foot 90. Swivel stud foot 90 may pass through slot 95 in response to swivel plate 30 rotating about centerline axis 1 (see FIG. 5). A gap may exist between swivel stud foot 90 and first side rail 50. Said gap may allow first side rail 50 to move relative to swivel plate 30. As illustrated, swivel plate 30 may include four swivel stud feet. In this regard, first side rail 50 may comprise two slots for accepting the swivel feet and second side rail 60 may comprise two slots for accepting the swivel feet.

Figure 8:
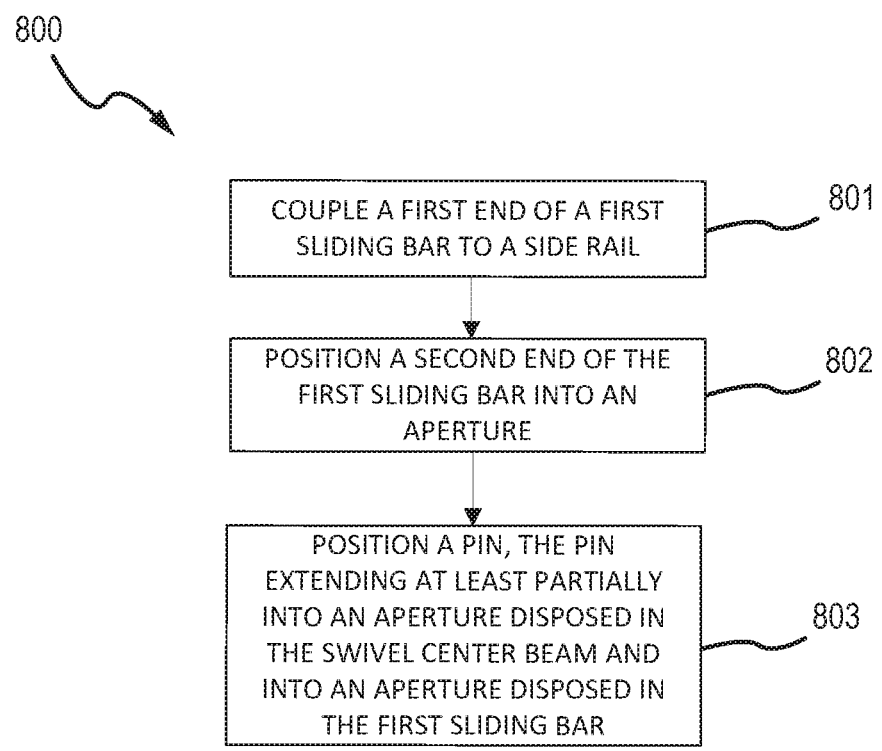
FIG. 8 illustrates a method of manufacturing a swivel base assembly, in accordance with various embodiments.

With reference to FIG. 8, a method 800 of manufacturing a swivel base assembly is provided, in accordance with various embodiments. In various embodiments, method 800 may include coupling a first end of a first sliding bar to a side rail (step 801). In various embodiments, method 800 may include positioning a second end of the first sliding bar into an aperture (step 802). In various embodiments, method 800 may include positioning a pin, the pin extending at least partially into an aperture disposed in the swivel center beam and into an aperture disposed in the first sliding bar (step 803).

With combined reference to FIG. 5 and FIG. 8, step 801 may include coupling a first end of first sliding bar 31 to first side rail 50. Step 802 may include positioning a second end of first sliding bar 31 into aperture 47 disposed in center beam 40. Step 803 may include positioning first pin 37 such that first pin 37 extends at least partially into aperture 35 disposed in center beam 40 and into aperture 33 disposed in first sliding bar 31.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A swivel base assembly for an aircraft seat, comprising:
   A swivel center beam;
   a swivel plate pivotally coupled to the swivel center beam, the swivel plate configured to rotate with respect to the swivel center beam about a first centerline axis;
   a first side rail coupled to the swivel center beam;
   a second side rail coupled to the swivel center beam, the swivel center beam being located between the first side rail and the second side rail; and
   wherein a track lug is pivotally coupled to the first side rail, the track lug configured to retain the first side rail in a track and translate along the track.

2. The swivel base assembly of claim 1, wherein a track pin is coupled to the first side rail, the track pin configured to prevent the first side rail from translating along the track in response to the track pin being in an extended position.

3. The swivel base assembly of claim 2, wherein a swivel stud foot is coupled to the swivel center beam and the first side rail comprises a slot, the swivel stud foot configured to pass through the slot in response to the swivel plate rotating about the first centerline axis.

4. The swivel base assembly of claim 3, wherein the swivel center beam defines a center aperture comprising the first centerline axis, a pivot coupled between the center aperture and the swivel plate.

5. The swivel base assembly of claim 4, wherein the swivel center beam comprises:
   a center body;
   a first member extending from the center body having a first aperture for receiving a first sliding bar for coupling the first member to the first side rail;
   a second member extending from the center body having a second aperture for receiving a second sliding bar for coupling the second member to the first side rail;
   a third member extending from the center body having a third aperture for receiving a first fastener for attaching the third member to the second side rail; and
   a fourth member extending from the center body having a fourth aperture for receiving a second fastener for attaching the fourth member to the second side rail.

6. The swivel base assembly of claim 5, wherein the first aperture comprises a second centerline axis, the second centerline axis being perpendicular with the first centerline axis.

7. The swivel base assembly of claim 6, wherein the first member is configured to receive a pin for retaining the first sliding bar at least partially within the first aperture.

8. The swivel base assembly of claim 7, wherein the pin extends in a direction being perpendicular with the second centerline axis.

9. The swivel base assembly of claim 8, wherein the pin is configured to shear in response to the swivel center beam moving relative to the first side rail in a direction along the second centerline axis.

10. The swivel base assembly of claim 5, wherein the center body, the first member, the second member, the third member, and the fourth member comprise a single, monolithic member.

11. A swivel center beam for an aircraft seat base assembly, comprising:
    A center body defining a center aperture having a first centerline axis;
    a first member extending from the center body having a first aperture for receiving a first sliding bar for coupling the first member to a first side rail;
    a second member extending from the center body having a second aperture for receiving a second sliding bar for coupling the second member to the first side rail;
    a third member extending from the center body having a third aperture for receiving a first fastener for attaching the third member to a second side rail;
    a fourth member extending from the center body having a fourth aperture for receiving a second fastener for attaching the fourth member to the second side rail;
    wherein the first member is configured to receive a pin for retaining the first sliding bar at least partially within the first aperture; and
    the pin is configured to shear in response to the swivel center beam moving relative to the first side rail.

12. The swivel center beam of claim 11, wherein the first aperture comprises a second centerline axis, the second centerline axis being perpendicular with the first centerline axis.

13. The swivel center beam of claim 12, wherein the pin extends in a direction being perpendicular with the second centerline axis.

14. The swivel center beam of claim 13, wherein the pin is configured to shear in response to the swivel center beam moving relative to the first side rail in a direction along the second centerline axis.

15. The swivel center beam of claim 11, wherein the center body, the first member, the second member, the third member, and the fourth member comprise a single, monolithic member.

16. A method of manufacturing a swivel base assembly for an aircraft seat, comprising:
    coupling a first end of a first sliding bar to a side rail;
    positioning a second end of the first sliding bar into a first aperture disposed in a swivel center beam;
    positioning a pin, the pin extending at least partially into a second aperture disposed in the swivel center beam and into an aperture disposed in the first sliding bar; and
    wherein the pin is configured to shear in response to the side rail moving with respect to the swivel center beam.

17. The method of claim 16, wherein the coupling the first end is performed by bolting the first end to the side rail.

* * * * *